United States Patent
Takeuchi et al.

(10) Patent No.: US 7,251,091 B2
(45) Date of Patent: Jul. 31, 2007

(54) CURRENT-SENSE BIAS CIRCUIT FOR A MAGNETORESISTIVE HEAD AND METHOD OF SENSING A CURRENT THERETHROUGH

(75) Inventors: Toru Takeuchi, Kanagawa (JP); Motomu Hashizume, Tokyo (JP)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/748,985

(22) Filed: Dec. 30, 2003

(65) Prior Publication Data

US 2005/0141119 A1  Jun. 30, 2005

(51) Int. Cl.
*G11B 5/03* (2006.01)
(52) U.S. Cl. .......................................... 360/66; 360/46
(58) Field of Classification Search ............... None
See application file for complete search history.

(56) References Cited

U.S. PATENT DOCUMENTS

| 6,226,137 | B1 * | 5/2001 | Ngo ............................ 360/46 |
| 6,420,910 | B1 * | 7/2002 | Contreras et al. ............. 327/77 |
| 6,532,127 | B1 * | 3/2003 | Ranmuthu et al. ............ 360/66 |
| 6,606,212 | B1 * | 8/2003 | Klaassen et al. .............. 360/67 |
| 2002/0030916 | A1 * | 3/2002 | Patti et al. .................... 360/66 |
| 2003/0227704 | A1 * | 12/2003 | Takayoshi et al. ............ 360/66 |

* cited by examiner

*Primary Examiner*—Andrea Wellington
*Assistant Examiner*—Varsha A. Kapadia
(74) *Attorney, Agent, or Firm*—Wade J. Brady, III; Frederick J. Telecky, Jr.

(57) ABSTRACT

The present invention provides a current-sense bias circuit for use with a magnetoresistive head. In one embodiment, the current-sense bias circuit includes a voltage biasing portion configured to provide a bias voltage across the magnetoresistive head thereby establishing a bias current through the magnetoresistive head. Additionally, the current-sense bias circuit also includes a current sensing portion coupled to the voltage biasing portion and configured to sense a change in the bias current based on a resistivity change of the magnetoresistive head.

4 Claims, 3 Drawing Sheets

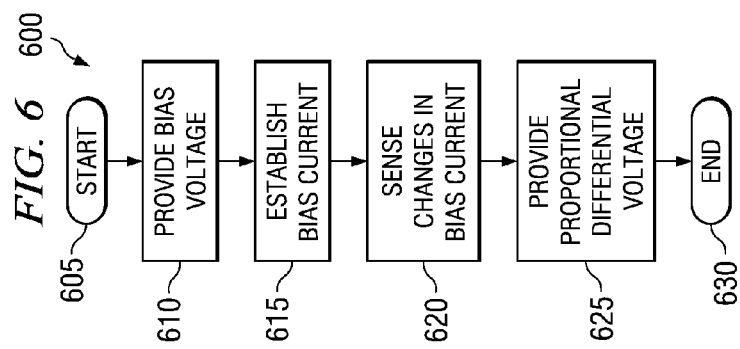
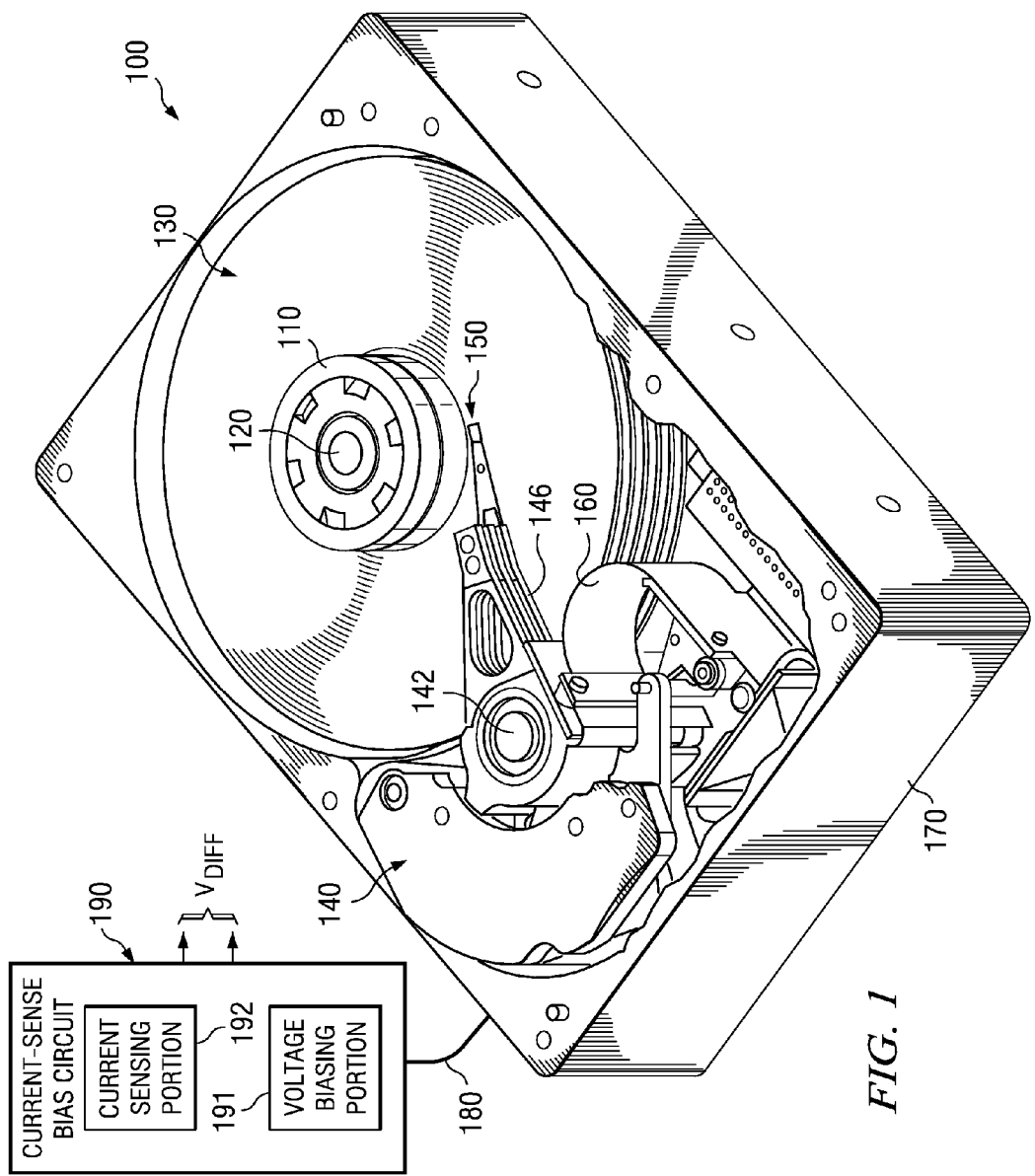

CURRENT-SENSE BIAS CIRCUIT FOR A MAGNETORESISTIVE HEAD AND METHOD OF SENSING A CURRENT THERETHROUGH

TECHNICAL FIELD OF THE INVENTION

The present invention is directed, in general, to magnetic recording and, more specifically, to a current-sense bias circuit for a magnetoresistive head, a method of sensing a current therethrough and a hard disk drive system employing the circuit or method.

BACKGROUND OF THE INVENTION

The magnetic recording industry has constantly and dramatically increased the performance and capacity of hard disk drives to meet the insatiable demand of the computer industry for more and better storage. Applications such as multimedia, real-time audio and video, graphical user interfaces and increasing program sizes are driving this increase. Hard disk areal density storage capacity has been increasing at an average yearly growth rate of at least 25 percent. Sustaining this growth in capacity has required progressive advances in many technologies used to provide a hard disk drive.

Historically, the read-write head technology was based on the inductive voltage produced when a permanently magnetized area on a rotating disk moved past a head employing a wire-wrapped magnetic core. Increasing areal density requirements drove a steady progression of inductive recording head advances, which culminated in advanced thin-film inductive read-write heads. Further advancements in this technology, and the ability to cost-effectively produce these heads has reached a point of diminishing return. Additionally, another critical limitation of the inductive head is that it must alternatively perform the conflicting tasks of writing data onto the disk and reading this previously-written data.

This limitation may be overcome by separating the write and read functions into two physically distinct heads. This allows using an inductive head that is optimized for writing data and a magnetoresistive head structure that is optimized for reading data. The magnetoresistive read head consists of a read element that is sandwiched between two highly-permeable magnetic shields. The shields assist in focusing the magnetic energy from the disk and rejecting stray fields. The magnetoresistive read element is made from a ferromagnetic alloy whose resistance changes as a function of an applied magnetic field. In the hard disk drive, this magnetic field is derived from the magnetized regions placed on the rotating disk by the write head and is used to modulate the resistivity of the magnetoresistive read element.

The magnetoresistive read element is biased using constant current sources that provide a constant bias current through the read element. As the resistivity of the read element changes due to the influence of the applied magnetic field, the voltage across the read element changes in direct proportion since the current through it is constant. This read element voltage is further conditioned by a high input impedance circuit to provide a read signal from the hard disk drive. Several problems arise due to this arrangement. The magnetoresistive read element is sensitive to voltage overstress and may be damaged if the voltage across it becomes too high. The bias current from the constant current sources is dynamically altered in an effort to prevent this voltage overstress. However, time delays associated with the high impedance circuits may be too long to avoid damage to the read head. Additionally, various device and parasitic capacitances combined with the high impedances also limit frequency bandwidth and signal responses.

What is needed in the art is a more effective way to bias a magnetoresistive head that reduces the present voltage overstress and signal response limitations.

SUMMARY OF THE INVENTION

To address the above-discussed deficiencies of the prior art, the present invention provides a current-sense bias circuit for use with a magnetoresistive head. In one embodiment, the current-sense bias circuit includes a voltage biasing portion configured to provide a bias voltage across the magnetoresistive head thereby establishing a bias current through the magnetoresistive head. Additionally, the current-sense bias circuit also includes a current sensing portion coupled to the voltage biasing portion and configured to sense a change in the bias current based on a resistivity change of the magnetoresistive head.

In another aspect, the present invention provides a method of sensing a current for use with a magnetoresistive head. The method includes providing a bias voltage across the magnetoresistive head thereby establishing a bias current through the magnetoresistive head. The method also includes sensing a change in the bias current based on a resistivity change of the magnetoresistive head.

The present invention also provides, in yet another aspect, a hard disk drive system. The hard disk drive system employs a motor, a storage medium coupled to the motor for rotation thereby and a magnetoresistive read head proximate at least one surface of the storage medium. The hard disk drive system includes a current-sense bias circuit for use with the magnetoresistive read head having a voltage biasing portion that provides a bias voltage across the magnetoresistive read head thereby establishing a bias current through the magnetoresistive read head. The current-sense bias circuit also has a current sensing portion, coupled to the voltage biasing portion, that senses a change in the bias current based on a resistivity change of the magnetoresistive read head.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which:

FIG. 1 illustrates a system diagram of an embodiment of a hard disk drive system constructed in accordance with the principals of the present invention;

FIG. 6 illustrates a flow diagram of an embodiment of a method of sensing a current carried out in accordance with the principles of the present invention.

DETAILED DESCRIPTION

Figure 2:
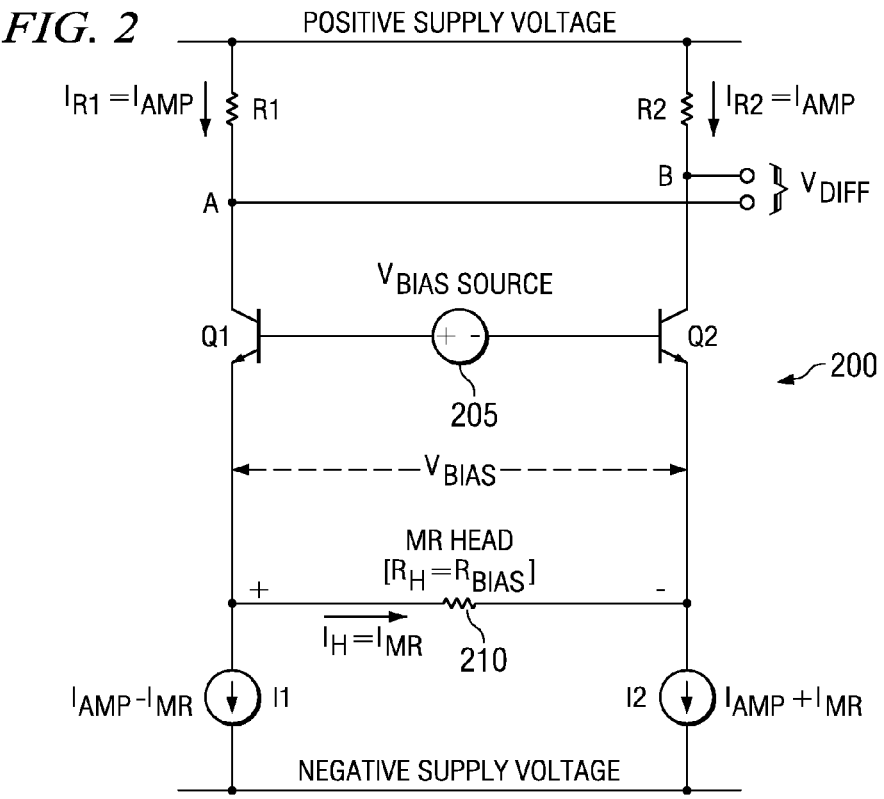
FIG. 2 illustrates a circuit diagram of an embodiment of a current-sense bias circuit constructed in accordance with the principles of the present invention.

Referring initially to FIG. 1, illustrated is a system diagram of an embodiment of a hard disk drive system, generally designated 100, constructed in accordance with the principals of the present invention. The hard disk drive 100 includes a motor 110, a drive spindle 120, a storage medium 130, an actuator 140 employing an actuator axis 142 and an actuator arm 146, a read-write head assembly 150, an interconnect cable 160, a housing 170, a coupling cable 180 and a current-sense bias circuit 190. The read-write head assembly 150 includes a magnetoresistive read head 150R and a separate write head 150W (which are not individually shown) proximate the storage medium 130. The current-sense bias circuit 190 is coupled to the magnetoresistive read head 150R via the coupling cable 180 and includes a voltage biasing portion 191 and a current sensing portion 192 that provides a differential output voltage $V_{DIFF}$.

In the illustrated embodiment, the hard disk drive 100 provides data storage, which may be employed by a processing or formatting system such as a computer. The motor 110 rotates the storage medium 130 on the spindle 120. The rotation of the spindle 120 is typically controlled by a feedback control circuit to ensure a constant speed. The actuator 140 is a mechanical device that controls movement of the actuator arm 146 around the actuator axis 142. The actuator arm 146 is a mechanical arm that supports and extends the read-write head assembly 150 over and inbetween the storage medium 130. The actuator 140 moves the read-write head assembly 150 to read or write data associated with designated sectors and tracks on the storage medium 130. The write head 150W writes the data onto the storage medium 130 as magnetized regions, which uniquely represent the data. These magnetized regions provide stored magnetic fields having two polarities on the storage medium 130.

The magnetoresistive read head 150R responds to these stored magnetic fields on the storage medium 130 wherein its resistivity changes depending on the characteristics of the stored magnetic fields. In the illustrated embodiment, the voltage biasing portion 191 of the current-sense bias circuit 190 provides a bias voltage across the magnetoresistive read head 150R thereby establishing a bias current through it. Additionally, the current sensing portion 192, which is coupled to the voltage biasing portion 191, senses a change in the bias current based on a resistivity change of the magnetoresistive read head 150R. This change in the bias current provides the differential output voltage $V_{DIFF}$, which is proportional to the bias current change.

The voltage biasing portion 191 operates as a voltage source across the magnetoresistive read head 150R. This provides a substantially constant bias voltage across the magnetoresistive read head 150R thereby alleviating the problem of voltage overstress and subsequent head damage. Use of a low impedance biasing voltage source also allows rapid biasing (i.e., bias turn-on) of the magnetoresistive read head 150R as an additional advantage over constant current biasing. Additionally, impedance values may be selected or tuned by adjusting the bias current through the magnetoresistive read head 150R. Improved bandwidth and response times typically also occur due to lower impedances and capacitances associated with the this low impedance biasing voltage source arrangement.

Turning now to FIG. 2, illustrated is a circuit diagram of an embodiment of a current-sense bias circuit, generally designated 200, constructed in accordance with the principles of the present invention. The current-sense bias circuit 200 includes first and second bipolar transistors Q1, Q2, first and second load resistors R1, R2, first and second current sources I1, I2 and an MR bias voltage ($V_{BIAS}$) source 205. A magnetoresistive (MR) read head 210 is coupled between first and second emitters of the first and second bipolar transistors Q1, Q2, as shown.

The current-sense bias circuit 200 employs the MR voltage bias source 205, positioned between first and second bases of the first and second bipolar transistors Q1, Q2. This provides an MR bias voltage $V_{BIAS}$ between the first and second emitters of the first and second bipolar transistors Q1, Q2, as shown. This arrangement forms a voltage biasing portion that establishes a voltage source (i.e., a low impedance source proportional to the MR voltage bias source 205) for the MR bias voltage $V_{BIAS}$. The illustrated embodiment employs NPN transistors for the first and second bipolar transistors Q1, Q2. However, it should be understood that it is well within the scope of the present invention for the current-sense bias circuit 200 to employ other transistor types. For example, this may include PNP bipolar, MOS transistors or JFET devices, as well as other appropriate future-developed devices.

The MR bias voltage $V_{BIAS}$ is applied across the MR read head 210 thereby establishing an MR bias current $I_{MR}$ through the MR read head 210. Since the MR bias voltage $V_{BIAS}$ is provided from a low impedance source, it does not change appreciably as the resistivity of the MR read head 210 changes under the influence of an applied magnetic field. The MR bias current $I_{MR}$ represents an MR read head current $I_H$ that is flowing for a quiescent condition wherein the MR read head 210 is not experiencing any substantial magnetic field excitation. A read head bias resistance $R_{BIAS}$ may be defined as the ratio of the MR bias voltage $V_{BIAS}$ to the MR bias current $I_{MR}$. Therefore, an MR read head resistance $R_H$ is equal to the read head bias resistance $R_{BIAS}$ for the quiescent condition.

First and second load resistor currents $I_{R1}$, $I_{R2}$ are each equal to a quiescent load current $I_{AMP}$ that also flows through the first and second bipolar transistors Q1, Q2. To account for the MR bias current $I_{MR}$, the first and second current sources I1, I2 employ differing first and second constant current values of $(I_{AMP}-I_{MR})$ and $(I_{AMP}+I_{MR})$, respectively. Since the values of the first and second load resistors R1, R2 are equal, a differential output voltage $V_{DIFF}$, measured between first and second nodes A, B, provides an output of zero volts at quiescence for the current-sense bias circuit 200. As will be discussed with respect to FIGS. 3 and 4, the differential output voltage $V_{DIFF}$ provides a current sensing portion of the current-sense bias circuit 200 that senses a change in the MR bias current $I_{MR}$ based on a resistivity change of the MR read head 210.

Figure 3:
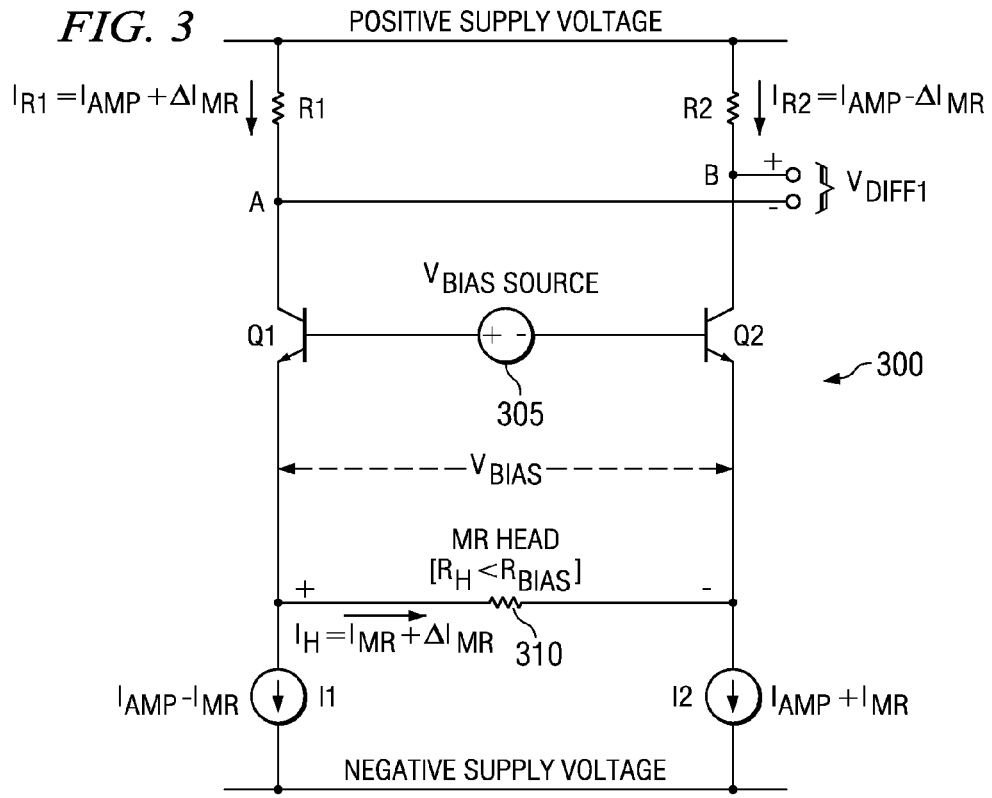
FIG. 3 illustrates a circuit diagram showing a non-quiescent condition of the current-sense bias circuit of FIG. 2 constructed in accordance with the principles of the present invention.

Turning now to FIG. 3, illustrated is a circuit diagram showing a non-quiescent condition of the current-sense bias circuit of FIG. 2, generally designated 300, constructed in accordance with the principles of the present invention. The current-sense bias circuit 300 includes first and second bipolar transistors Q1, Q2, first and second load resistors R1, R2, first and second current sources I1, I2 and an MR bias voltage ($V_{BIAS}$) source 305, as before. A magnetoresistive (MR) read head 310 is again coupled between first and second emitters of the first and second bipolar transistors Q1, Q2.

The current-sense bias circuit 300 reflects a change in the MR bias current $I_{MR}$ due to an applied magnetic field. The applied magnetic field causes a decrease in the resistivity of the MR read head 310, and therefore, an MR read head resistance $R_H$ that is less than the read head bias resistance $R_{BIAS}$. This condition causes an incremental increase in the MR read head current $I_H$ since the MR bias voltage $V_{BIAS}$ does not change appreciably. The MR read head current $I_H$ increases to a value of ($I_{MR}+\Delta I_{MR1}$), which is the MR bias current $I_{MR}$ plus an incremental MR bias current $\Delta I_{MR1}$.

The first and second current sources I1, I2 maintain their respective constant current values of ($I_{AMP}-I_{MR}$) and ($I_{AMP}+I_{MR}$). This condition forces the change in the MR bias current $I_{MR}$ to be reflected in the first and second load resistor currents $I_{R1}$, $I_{R2}$. The first load resistor current $I_{R1}$ increases to a value of ($I_{AMP}+\Delta I_{MR1}$), which is the quiescent load current $I_{AMP}$ plus the MR incremental bias current $\Delta I_{MR1}$. Analogously, the second load resistor current $I_{R2}$ decreases to a value of ($I_{AMP}-\Delta I_{MR1}$). These incremental load current changes cause the voltage at node A to decrease and the voltage at node B to increase thereby providing a differential output voltage $V_{DIFF1}$ having the polarity shown. Therefore, the change in the MR bias current $I_{MR}$ provides a proportional differential output voltage $V_{DIFF1}$ having a magnitude of $\Delta I_{MR1}(R1+R2)$.

Figure 4:
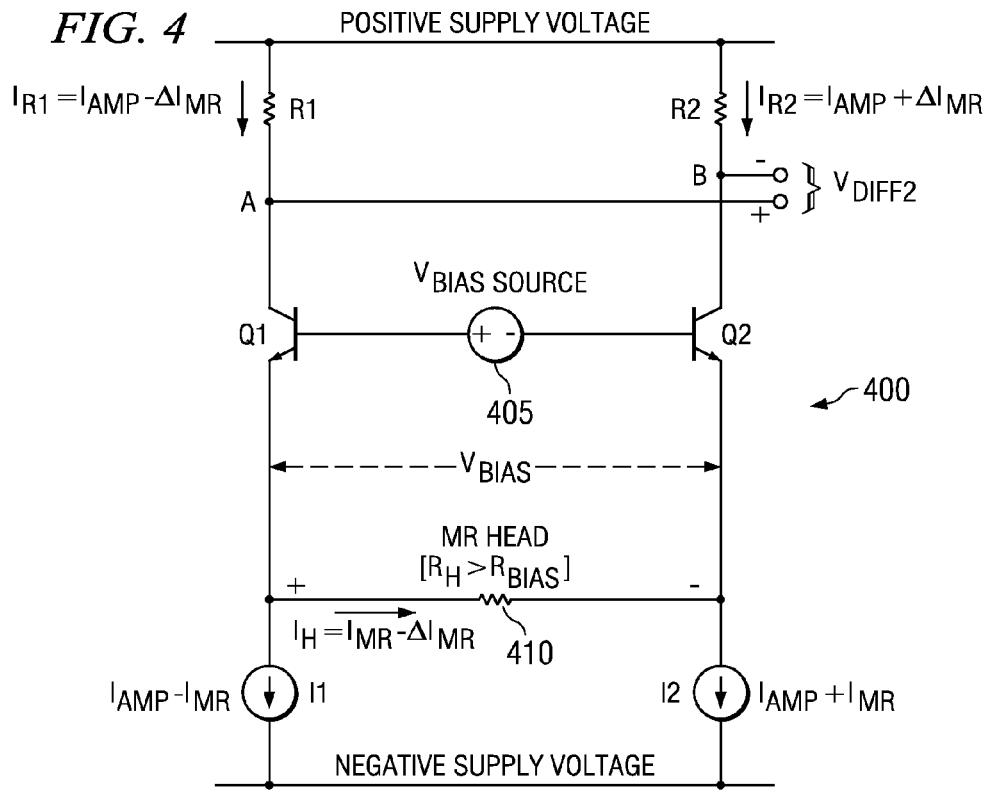
FIG. 4 illustrates a circuit diagram showing an alternative non-quiescent condition of the current-sense bias circuit of FIG. 2 constructed in accordance with the principles of the present invention.

Turning now to FIG. 4, illustrated is a circuit diagram showing an alternative non-quiescent condition of the current-sense bias circuit of FIG. 2, generally designated 400, constructed in accordance with the principles of the present invention. The current-sense bias circuit 400 includes first and second bipolar transistors Q1, Q2, first and second load resistors R1, R2, first and second current sources I1, I2 and an MR bias voltage ($V_{BIAS}$) source 405, as before. A magnetoresistive (MR) read head 410 is again coupled between first and second emitters of the first and second bipolar transistors Q1, Q2.

The current-sense bias circuit 400 reflects a change in the MR bias current $I_{MR}$ due to an applied magnetic field that is opposite in polarity to the magnetic field applied in FIG. 3. Here, the applied magnetic field causes an increase in the resistivity of the MR read head 410, and therefore, an MR read head resistance $R_H$ that is greater than the read head bias resistance $R_{BIAS}$. This condition causes an incremental decrease in the MR read head current $I_H$ since the MR bias voltage $V_{BIAS}$ does not change appreciably. The MR read head current $I_H$ decreases to a value of ($I_{MR}-\Delta I_{MR2}$), which is the MR bias current $I_{MR}$ minus the MR incremental bias current $\Delta_{IMR2}$.

The first and second current sources I1, I2 again maintain their respective constant current values of ($I_{AMP}-I_{MR}$) and ($I_{AMP}+I_{MR}$). This condition again forces the change in the MR bias current $I_{MR}$ to be reflected in the first and second load resistor currents $I_{R1}$, $I_{R2}$. The first load resistor current $I_{R1}$ decreases to a value of ($I_{AMP}-\Delta I_{MR2}$), which is the quiescent load current $I_{AMP}$ minus the MR incremental bias current $\Delta I_{MR2}$. Analogously, the second load resistor current $I_{R2}$ increases to a value of ($I_{AMP}+\Delta I_{MR2}$). These incremental load current changes cause the voltage at node A to increase and the voltage at node B to decrease thereby providing a differential output voltage $V_{DIFF2}$ having the polarity shown. Therefore, the change in the MR bias current $I_{MR}$ provides a proportional differential output voltage $V_{DIFF2}$ having a magnitude corresponding to $\Delta I_{MR2}(R1+R2)$ and a polarity opposite to that discussed with respect to FIG. 3.

As may be seen with respect to FIGS. 3 and 4, an alternating magnetic field, when applied to an MR read head employing an embodiment of a current-sense bias circuit, would provide an alternating differential output voltage that is proportional to the alternating magnetic field. This alternating differential output voltage results from sensing a change in a bias current through the MR read head wherein the bias current is established by an MR bias voltage connected across the MR read head.

Figure 5:
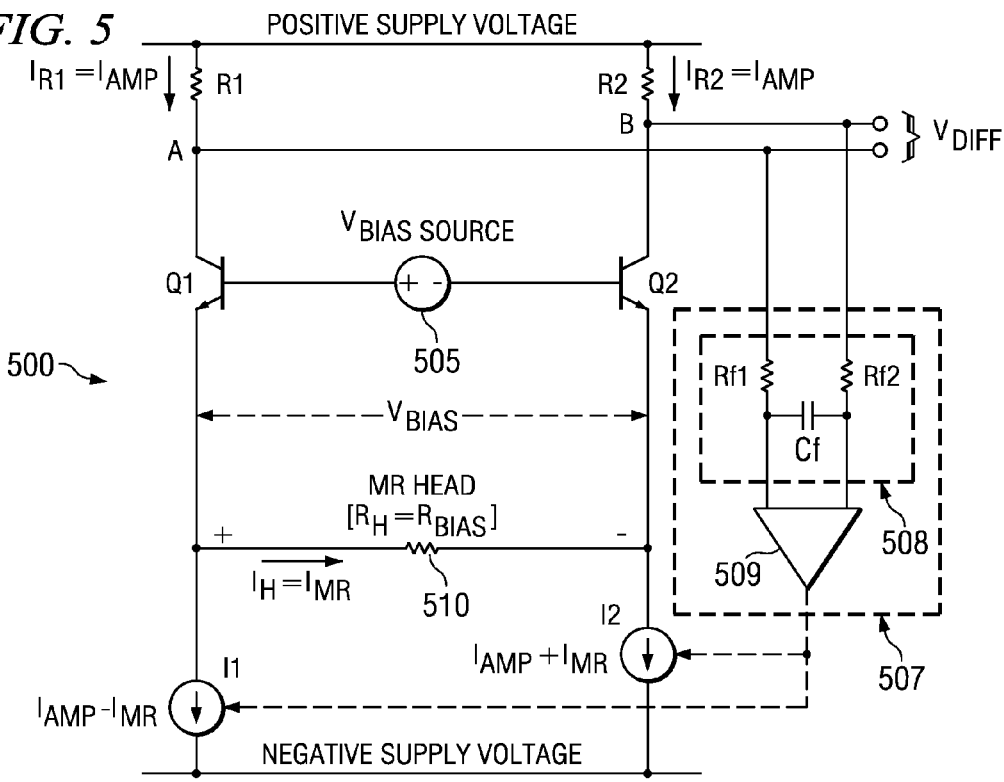
FIG. 5 illustrates a circuit diagram of an alternative embodiment of a current-sense bias circuit constructed in accordance with the principles of the present invention.

Turning now to FIG. 5, illustrated is a circuit diagram of an alternative embodiment of a current-sense bias circuit, generally designated 500, constructed in accordance with the principles of the present invention. The current-sense bias circuit 500 includes first and second bipolar transistors Q1, Q2, first and second load resistors R1, R2, first and second controllable current sources I1, I2, an MR bias voltage ($V_{BIAS}$) source 505 and a current source control circuit 507. A magnetoresistive (MR) read head 510 is coupled between first and second emitters of the first and second bipolar transistors Q1, Q2, as shown.

The resistivity of the MR read head 510 may vary from unit to unit due to production tolerances or when using a variety of magnetoresistive heads having differing resistivities. In the illustrated embodiments of FIGS. 2, 3 and 4, the quiescent load current $I_{AMP}$ is assumed to be much greater than the MR bias current $I_{MR}$. This condition accommodates a variation in head resistivity without appreciably affecting the quiescent operation of the current-sense bias circuits discussed. However, for a condition where variations in head resistivity may otherwise affect quiescent operation, the current-sense bias circuit 500 may be employed.

The current source control circuit 507 is coupled between the differential output voltage $V_{DIFF}$ and the first and second controllable current sources I1, I2, as shown. Its operation adjusts the first and second controllable current sources I1, I2 such that the differential output voltage $V_{DIFF}$ is forced to be substantially zero for the quiescent condition. This adjusting action compensates for variations in head resistivity and MR bias current $I_{MR}$ thereby allowing an appropriate quiescent condition to be established and maintained.

In the illustrated embodiment, the current source control circuit 507 employs an input low pass filter 508 and an amplifier circuit 509. The input low pass filter 508 includes first and second filter resistors Rf1, Rf2 and a filter capacitor Cf, which allow the differential output voltage $V_{DIFF}$ to be fully applied to the amplifier circuit 509, at quiescence. However, when the MR read head 510 is responding to (i.e., reading) a changing magnetic field, values of the first and second filter resistors Rf1, Rf2 and the filter capacitor Cf are chosen to assure that the differential output voltage $V_{DIFF}$ is substantially unaffected by the presence of the current source control circuit 507. Additionally, alternative embodiments of the current source control circuit 507 may be employed. For example, these may include a transconductance differential amplifier, a capacitor low pass filter architecture or other appropriate current or future-developed devices and circuits.

Turning now to FIG. 6, illustrated is a flow diagram of an embodiment of a method of sensing a current, generally designated 600, carried out in accordance with the principles of the present invention. The method 600 starts in a step 605 with an intent to sense a current in a magnetoresistive head responding to a changing magnetic field. A bias voltage is provided across the magnetoresistive head in a step 610. Providing the bias voltage employs first and second bipolar transistors wherein the magnetoresistive head is placed between the emitters of the first and second bipolar transistors. The bias voltage employs a bias voltage source that is placed between the bases of the first and second bipolar transistors. A bias current through the magnetoresistive head is established by the bias voltage in a step 615.

Then in a step 620, a change in the bias current is sensed based on a resistivity change of the magnetoresistive head due to the changing magnetic field. First and second current sources direct the change in the bias current to first and second resistors that are employed to develop a differential voltage proportional to the bias current change in a step 625. The polarity of the proportional differential voltage depends on the polarity of the changing magnetic field. The method 600 ends in a step 630.

While the method disclosed herein has been described and shown with reference to particular steps performed in a particular order, it will be understood that these steps may be combined, subdivided, or reordered to form an equivalent method without departing from the teachings of the present invention. Accordingly, unless specifically indicated herein, the order and/or the grouping of the steps are not limitations of the present invention.

In summary, embodiments of the present invention employing a current-sense bias circuit and a method of sensing a current change in a magnetoresistive head have been provided. The current-sense bias circuit and method provide a bias voltage source directly across the magnetoresistive head thereby establishing a bias current through the head. Advantages include rapid biasing of the magnetoresistive head since the biasing voltage is provided from a low impedance source. This condition essentially eliminates voltage overstress of the magnetoresistive head that may occur with constant current biasing techniques. Improved bandwidth and response times typically occur due to lower associated impedances and capacitances. Additionally, impedance values may be selected or tuned by adjusting the bias current through the magnetoresistive head. An output differential voltage is provided that is proportional to resistivity changes in the magnetoresistive head.

Although the present invention has been described in detail, those skilled in the art should understand that they can make various changes, substitutions and alterations herein without departing from the spirit and scope of the invention in its broadest form.

What is claimed is:

1. A current-sense bias circuit for use with a magnetoresistive head, comprising:
   (a) first and second transistors with first and second emitters, respectively, where said first emitter couples to a first terminals of said magnetoresistive head and said second emitter couples to a second terminals of said magnetoresistive head;
   (b) a bias source connected between the base of said first transistor and the base of said second transistor, whereby said bias source established a bias voltage across said magnetoresistive head;
   (c) first and second resistors, where said first resistor connects to the collector of said first transistor, and where said second resistor connects to the collector of said second transistor;
   (d) first and second current sources providing first and second currents, respectively, where said first current source connects to said first emitter and couples to said first terminal of said magnetoresistive head, and where said second current source connects to said second emitter and couples to said second terminal of said magnetoresistive head;
   (e) wherein a quiescent bias current through said magnetoresistive head equals the difference between said first current and said second current;
   (f) wherein the emitter current of said first emitter equals said first current plus the current through said magnetoresistive head and the emitter current of said second emitter equals said second current minus said current through said magnetoresistive head;
   (f) whereby when said current through said magnetoresistive head varies from said quiescent bias current through said magnetoresistive head, such current variation appears in said first emitter current and in said second emitter current and results in a variation in the voltages at said first and second collectors and at said first and second resistors.

2. The current-sense bias circuit of claim 1, further comprising:
   (a) a current source control circuit with inputs connected to said first and second collectors and with output controlling said first and second current sources, whereby when said current through said magnetoresistive head is said quiescent bias current through said magnetoresistive head, said first and second collectors have the same votlage.

3. A hard disk drive system, comprising:
   (i) a motor;
   (ii) a storage medium coupled to said motor for rotation thereby;
   (iii) a magnetoresistive head proximate at least one surface of said storage medium; and
   (iv) a current-sense bias circuit for use with said magnetoresistive head, including:
      (a) first and second transistors with first and second emitters, respectively, where said first emitter couples to a first terminals of said magnetoresistive head and said second emitter couples to a second terminals of said magnetoresistive head;
      (b) a bias source connected between the base of said first transistor and the base of said second transistor, whereby said bias source established a bias voltage across said magnetoresistive head;
      (c) first and second resistors, where said first resistor connects to the collector of said first transistor, and where said second resistor connects to the collector of said second transistor;
      (d) first and second current sources providing first and second currents, respectively, where said first current source connects to said first emitter and couples to said first terminal of said magnetoresistive head, and where said second current source connects to said second emitter and couples to said second terminal of said magnetoresistive head;
      (e) wherein a quiescent bias current through said magnetoresistive head equals the difference between said first current and said second current;
      (f) wherein the emitter current of said first emitter equals said first current plus the current through said magnetoresistive head and the emitter current of said second emitter equals said second current minus said current through said magnetoresistive head;

(f) whereby when said current through said magnetoresistive head varies from said quiescent bias current through said magnetoresistive head due to magnetic fields from said storage medium, such current variation appears in said first emitter current and in said second emitter current and results in a variation in the voltages at said first and second collectors and at said first and second resistors.

4. The hard disk drive system of claim 3, further comprising:

(a) a current source control circuit with inputs connected to said first and second collectors and with output controlling said first and second current sources, whereby when said current through said magnetoresistive head is said quiescent bias current through said magnetoresistive head, said first and second collectors have the same votlage.

\* \* \* \* \*